United States Patent
Nair

(10) Patent No.: US 8,866,454 B2
(45) Date of Patent: Oct. 21, 2014

(54) DC-DC CONVERTER ARRANGEMENT

(75) Inventor: Mukesh Nair, Bangalore (IN)

(73) Assignee: NXP B.V., Eindhoven (NL)

( * ) Notice: Subject to any disclaimer, the term of this patent is extended or adjusted under 35 U.S.C. 154(b) by 197 days.

(21) Appl. No.: 13/576,315

(22) PCT Filed: Jan. 11, 2011

(86) PCT No.: PCT/IB2011/050112
§ 371 (c)(1),
(2), (4) Date: Sep. 5, 2012

(87) PCT Pub. No.: WO2011/098924
PCT Pub. Date: Aug. 18, 2011

(65) Prior Publication Data
US 2012/0319667 A1    Dec. 20, 2012

(30) Foreign Application Priority Data

Feb. 12, 2010    (EP) .................................. 10153497

(51) Int. Cl.
G05F 1/00    (2006.01)
G05F 1/24    (2006.01)
H02M 3/158    (2006.01)

(52) U.S. Cl.
CPC .................................. *H02M 3/1582* (2013.01)
USPC ........................................ 323/271; 323/259

(58) Field of Classification Search
CPC ............. G05F 1/24; G05F 1/623; G05F 1/40; G05F 1/56; H02J 7/00; H02M 3/156
USPC ........................... 323/259, 271, 282, 284, 285
See application file for complete search history.

(56) References Cited

U.S. PATENT DOCUMENTS

| 4,672,303 | A | * | 6/1987 | Newton | 323/285 |
|---|---|---|---|---|---|
| 6,037,755 | A | * | 3/2000 | Mao et al. | 323/222 |
| 7,190,600 | B1 | | 3/2007 | Ung | |
| 7,701,179 | B2 | * | 4/2010 | Chen et al. | 323/259 |
| 7,843,177 | B2 | * | 11/2010 | Ho et al. | 323/222 |
| 8,274,266 | B2 | * | 9/2012 | Engelhardt et al. | 323/259 |
| 8,686,697 | B2 | * | 4/2014 | Ujike et al. | 323/222 |
| 8,773,084 | B2 | * | 7/2014 | Casey et al. | 323/259 |
| 2001/0042739 | A1 | | 11/2001 | Mela | |
| 2007/0075689 | A1 | * | 4/2007 | Kinder et al. | 323/259 |
| 2009/0203966 | A1 | * | 8/2009 | Mizuyoshi | 600/182 |
| 2010/0118575 | A1 | | 5/2010 | Reschenauer | |
| 2014/0210437 | A1 | * | 7/2014 | Chen | 323/271 |

FOREIGN PATENT DOCUMENTS

WO    2008/098812 A1    8/2008

OTHER PUBLICATIONS

European Search Report for European Patent Appln. No. 10153497 (May 6, 2010).

* cited by examiner

*Primary Examiner* — Matthew Nguyen

(57) ABSTRACT

ADC-DC converter, for a solar charger, is disclosed. The converter is based on a buck-boost converter, and is operable both in a boost mode, and in a buck mode. The converter differs from known converters, in that during buck mode operation, the boost mode is disabled, thereby reducing or eliminating the losses associated with buck mode operation. Methods of operating such a reconfigurable buck-boost converter are also disclosed as is a computer programme product for controlling a reconfigurable buck-boost converter.

12 Claims, 5 Drawing Sheets

DC-DC CONVERTER ARRANGEMENT

FIELD OF THE INVENTION

This invention relates to the DC-DC converters. It further relates to solar chargers comprising DC-DC converters. It yet further relates to methods of operating DC-DC converters, and to computer program products arranged for operating DC-DC converters.

BACKGROUND OF THE INVENTION

For some applications, such as for instance maximum power point tracking solar charge controllers, DC-DC converters are required which are able to cope with a variable input voltage which, depending on conditions, may vary between greater or lower than the desired output voltage.

A commonly-used converter for such an application is a buck-boost converter. A buck-boost converter is a type of DC-DC converter that has an output voltage magnitude that can be set to be either greater than or less than the input voltage magnitude. It is a switched mode power supply (SMPS) with a similar circuit topology to the boost converter and the buck converter. The output voltage is adjustable typically based on the duty cycle of the switching transistor.

A buck-boost converter configuration is shown in FIG. 1a, along-side the conduction circuits in its on-state at FIG. 1b and in its off-state at FIG. 1c. The circuit has an input, with voltage Vin, which is switchably connectable by means of a switch S to an inductor L. Connected in parallel with the inductor L is a series combination of a diode D and a capacitor C. The output, with voltage Vout, is across the capacitor C, and load, such as a resistor R as shown may be connected across the output.

The converter operates by pulse wave modulation (PWM) as follows: while in the on-state, the input voltage source is directly connected to the inductor (L). This results in accumulating energy in L. In this state, the capacitor supplies energy to the output load, both as shown schematically in FIG. 1b.

While in the off-state, the inductor is connected to the output load and capacitor, so energy is transferred from L to C and R, as shown schematic in FIG. 1c.

In the most widely used, continuous conduction, mode (CCM), it can be easily proved based on the energy equation in steady state that the duty cycle of the PWM can we written as $$D = Vout/(Vout + Vin).$$

Thus the circuit has to operate with a duty cycle less than 50% in the buck mode and greater than 50% in boost mode of operation.

It should be mentioned that one possible drawback of this converter is that the switch does not have a terminal at ground; this complicates the driving circuitry. Another is that the polarity of the output voltage is opposite that of the input voltage. Neither drawback is of any consequence if the power source is isolated from the load circuit (if, for example, the source is a battery, such as is the case for a solar charge controller) as the source and diode can simply be reversed and the switch moved to the ground.

In general, a buck-boost converter, operating in buck mode, is less efficient than a buck converter. The main reason for this is that, for a buck-boost converter, the inductor current flows to ground during the ON time and only a fraction flows to the output during the OFF time, especially in continuous mode of operation. In contrast, in normal buck converter operation the current is transferred to the load through the inductor in the ON cycle, whilst out of this a small portion is stored in the inductor. This stored current is then pumped into the load during the off cycle. In applications where the charger operates predominately in buck mode, it is important to improve the efficiency of the circuit in buck mode of operation.

A DC-DC converter which is switchable between a boost-mode and a buck-mode is known, for instance as shown in FIG. 2. This shows a cascaded buck-boost arrangement which is similar to the conventional buck-boost arrangement, except that instead of an inductor, there is an input diode (D21) switchably connected across the input; the inductor is in series with the output diode (D22) and capacitor (C), and there is a second switch S22 connected between the output side of the inductor and ground.

However, this circuit suffers from the disadvantages that in the buck mode of operation the free wheeling current has to go through 2 diodes (D22 and D21) resulting an additional power drop, which may be significant for high current levels. Furthermore, both the switches S21 and S22 are switching elements and need gate drive circuits to be added to the overall design which consumes power. There thus results in extra power losses occurring due to these switching elements. Furthermore, a larger number of components needed. Finally, the arrangement is a synchronous converter which is based on synchronous switching of the circuit elements, and thus requires careful design to avoid overlap or dead zones of conduction while making the transitions.

There is thus an ongoing need to provide a DC-DC converter, which can operate as a buck boost converter, which suffers to a lesser extent from some all of the above disadvantages.

SUMMARY OF THE INVENTION

According to first aspect of the invention there is provided a DC-DC converter, the DC-DC converter comprising first and second input terminals and first and second output terminals, a buck-boost converter operable in a boost mode and in a buck mode and comprising a rectifying device D1 and further comprising a first switch electrically coupled to the first input terminal and arranged for electrically coupling the first input terminal to the first output terminal via the rectifying device, a second switch electrically coupled to the second input terminal and arranged for coupling the second input terminal to the second output terminal, and a switching device between the first output terminal and the second input terminal, wherein the second switch and the switching device are arranged so as to be able to disable the boost mode. By disabling the boost mode, the losses associated with a buck-boost converter operating in buck-mode can be reduced.

In embodiments, the buck-boost converter further comprises an inductor electrically coupled between the second output terminal and a node between the first switch and the rectifying device, and a capacitor electrically coupled between the first and second output nodes.

In embodiments, the switching device comprises a diode. This provides for a particularly simple arrangement. In other embodiments the switching device comprises a MOSFET. Use of a MOSFET allows for a further increase in efficiency, since the losses associated with forward condition through the diode can be eliminated at least to some extent, albeit at the expense of a slightly more complex control arrangement, for synchronous operation of the MOSFET with buck/boost mode selector switch. In embodiments, the rectifying device is a diode.

According to another aspect of the invention, there is provided a solar charger comprising a DC-DC converter as described above.

According to another aspect of the invention, there is provided a method of controlling a DC-DC converter comprising a Pulse width modulation switch and for converting an input voltage to a required output voltage at an output, the method including: in response to the input voltage being less than the required output voltage, configuring the converter for operation as a buck-boost converter and controlling a duty cycle of the pulse width modulation switch for boost mode operation, and in response to the input voltage being greater than the required output voltage, configuring the converter for operation as a buck converter and disabling the boost mode.

In embodiments, disabling the boost mode comprises opening a switch in the return path of the converter between a first output terminal and an input terminal. The method may further comprise operating a switching device synchronously with the pulse width modulation switch thereby periodically electrically coupling a second terminal of the output, opposite to the first terminal, to the input terminal.

In embodiments, the method further comprises reconfiguring the converter for operation as buck-boost converter or buck converter in response to the input voltage respectively being becoming less than or exceeding the required output by a respective first or second hysteresis level. By such hysteresis levels, which may be the same of different, bouncing between buck-boost, and buck configurations, may be avoided through the control algorithm.

According to a yet further aspect of the invention there is provided a computer programme product, which, when implemented on a computer, controls a DC-DC converter to operate according to any of the methods described above.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1A:
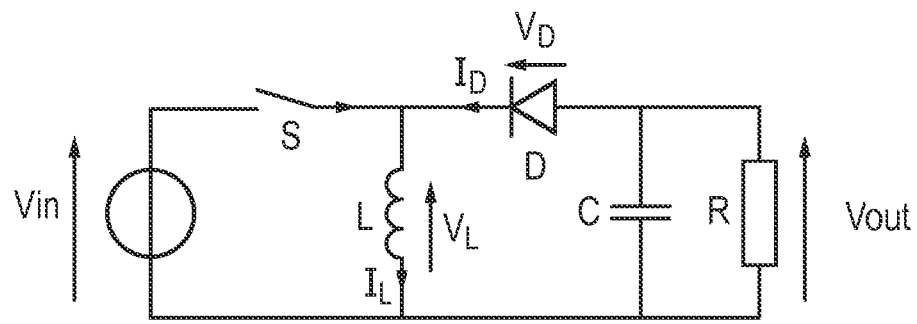
FIG. 1 shows at 1a a schematic circuit diagram of a conventional buck-boost converter, and the current flows during an on-state at FIG. 1b, and the current flow during an off-state at FIG. 1c.
Figure 1B:
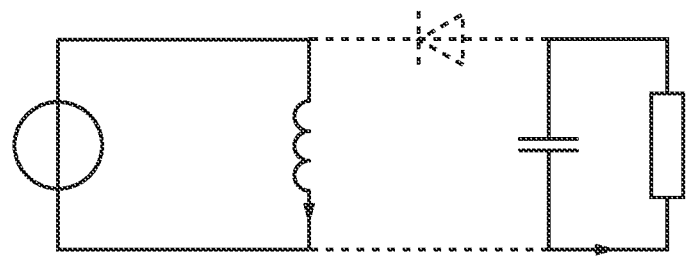
Figure 1C:
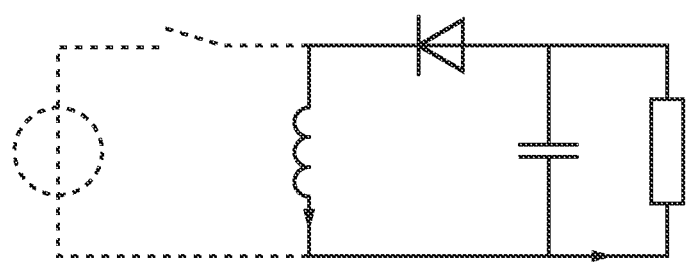
Figure 2:
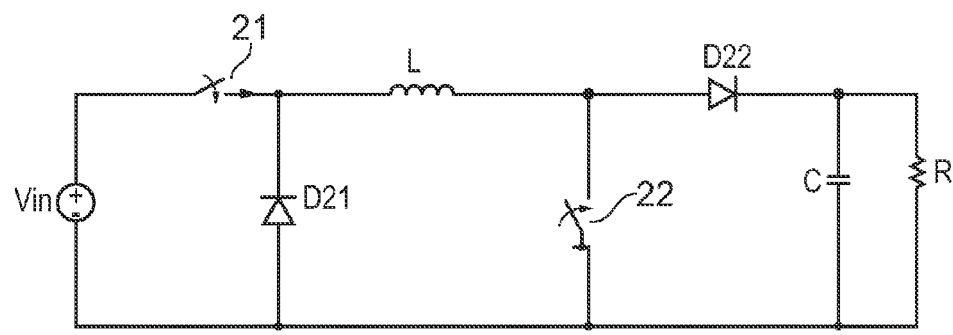
FIG. 2 shows a simplified schematic of a synchronous cascaded buck-boost converter.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 3:
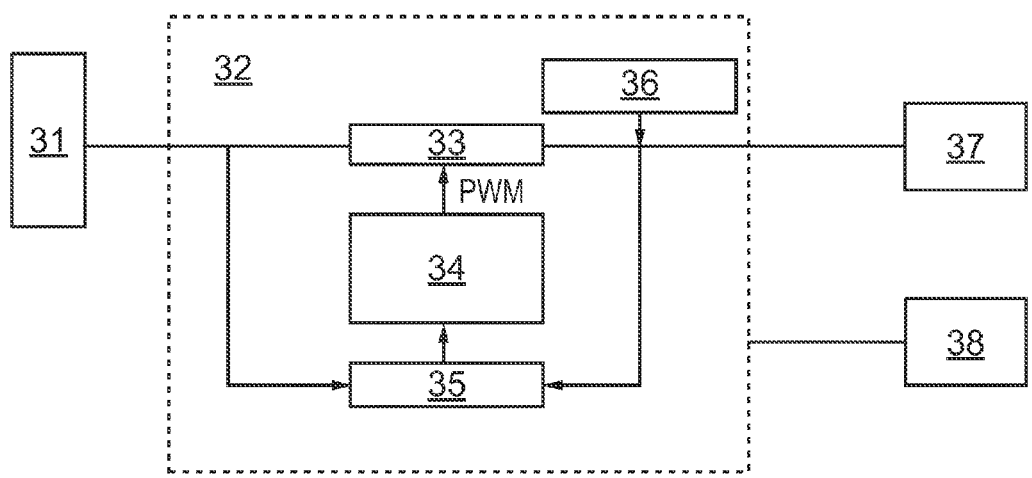
FIG. 3 shows an arrangement of a maximum PowerPoint tracking similar charge controller arrangement including a DC-DC converter.

FIG. 3 shows an arrangement of a Maximum Power Point tracking (MPPT) solar charge controller arrangement including a DC-DC converter. The arrangement comprises a photovoltaic (PV) array 31, which provides an input to the MPPT solar charge controller 32. The solar charge controller comprises a DC-DC converter 33, the pulse wave modulation switching of which is under the control of an MPPT algorithm within a controller 34. The solar charge controller 32 conventionally includes sensing circuits 35 in order to provide feedback, together with protection module 36 which also provides a safety function. The solar charge controller is normally arranged to charge the battery 37 and may be, in addition or alternatively, connected to a load 38.

The charge controller 32 typically controls the operating point of the PV panel 31 charging the battery 37. Since the maximum Power Point (MPP) of a PV array varies inversely with the temperature of the panel, in certain cases, especially in warm regions, the MPP voltage can be close to the battery voltage or even below it. To ensure that the power available from the PV array is fully utilised it is necessary to have a boost functionality in the charger. Thus a buck boost-converter is required.

Figure 4:
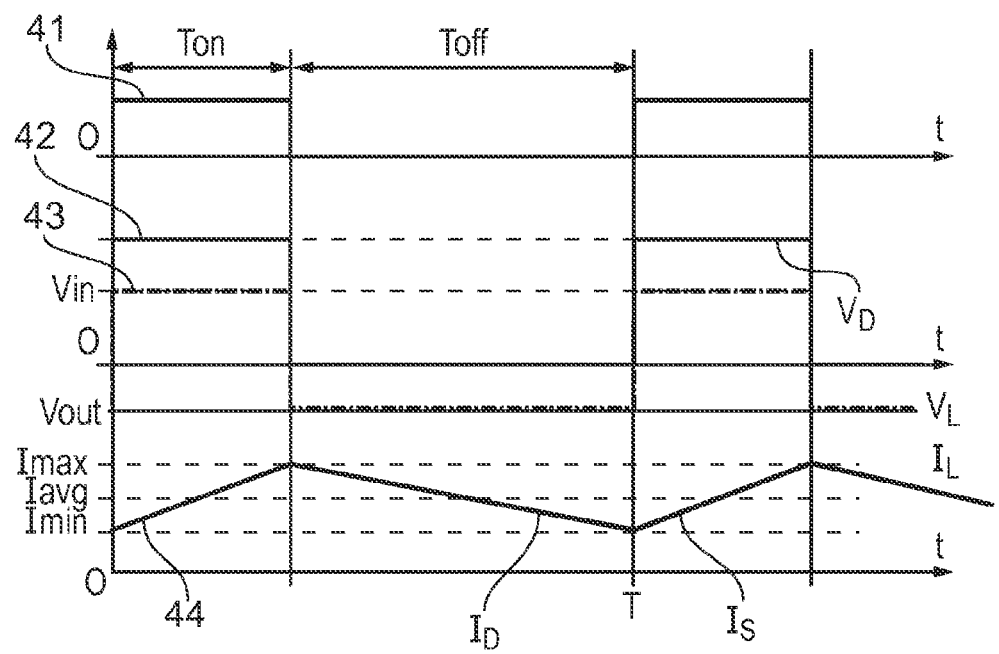
FIG. 4 shows the waveforms for a buck boost concern circuit operating in continuous mode.

FIG. 4 shows the waveforms for a buck boost concern circuit operating in continuous mode: the top curve 41 shows the state of the switch, which is alternately on, or high, during each interval Ton, and off or low during each interval Toff. The second graph 42 shows the voltage (VD) across the diode, which voltage is high during the on-time (that is to say, it is equal to (Vin+Vout)) due to the inverting topology, and low (that is, nearly zero since it is equal to only the forward voltage drop Vf across the diode) during the off-time. The third graph 43 shows the voltage (VL) across the inductor, which is a copy of the voltage across the diode, but displaced by an amount equal to the output voltage (Vout), such that during the off period it is equal to −(Vout+Vf), and during the on period is equal to the input voltage Vin.

The inductor current $I_L$ 44, shown in the fourth graph, rises from minimum Imin linearly to a maximum Imax, and then falls linearly during the off-time back to the minimum, resulting an in average current level Iavg. In practice, the inductor current $I_L$ is a combination of the diode current ID (which is falling during the OFF time and is zero during the ON time) and the Switch current $I_S$ (which is zero during the off time and rises during the on-time).

The output current is the current pumped by the inductor during the OFF period. This is the same current that freewheels through the diode. Thus in a known circuit the current is stored in the inductor in the ON period and transferred to the load only in the OFF period. During ON period no current flows form the source to the load but is only utilised for storing energy in the inductor. During this ON period the capacitor feeds the current to the load to maintain the current required.

Figure 5:
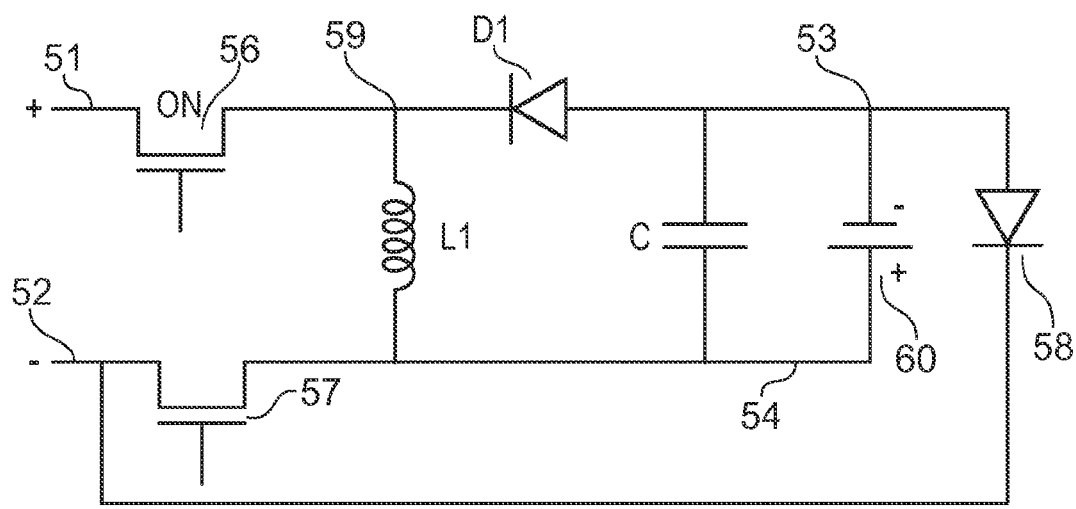
FIG. 5 shows a schematic circuit diagram of a buck-boost converter arranged according to an embodiment of the present invention.

FIG. 5 shows a schematic circuit diagram of a buck-boost converter arranged according to an embodiment of the present invention. The buck-boost converter comprises a DC input having positive and negative terminals 51 and 52 respectively. The positive input 51 is connected to one terminal of an inductor L1 by means of a switch 56, the other terminal of the inductor L1 is connected to the (positive) second terminal 54 of the output which also has a first (negative) terminal 53. As in a conventional buck-boost converter the output is inverted with respect to the input, such that the first terminal 53 of the output is negative with respect to the second terminal 54. Similar to a conventional buck boost converter, the inductor L1 is connected in parallel with a series combination of a diode D1 and a capacitor C. The output is in parallel with the capacitor C, and has output terminals 53, at the node between diode D1 and capacitor C, and 54 connected to the other side of the capacitor C. In this embodiment, the output is shown as a battery 60 such as would be provided in any similar charge controller. However, the output is not so limited, and may be another load. In this buck-boost converter, in contrast to a conventional converter, the second terminal of the inductor L1 is not connected directly to the second terminal 52 of the input, but is connected thereto by means of a second switch 57. As will be described in more detail below, this second switch 57 acts, when open, to disable the boost mode of the buck-boost converter.

In addition, there is provided a further diode 58 which is connected between the first output terminal 53, and the second input terminal 52. As will be described in more detail herebelow, diode 58 provides a return path for the buck-boost converter when it is constrained to operate in buck mode by the switching off switch 57.

Figure 6A:
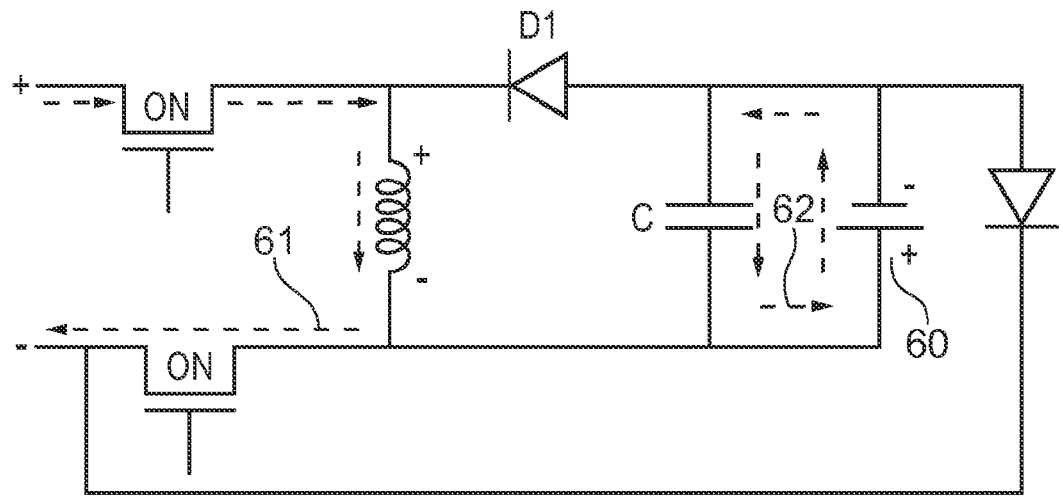
FIG. 6 shows the current flows for a buck-boost converter arranged according to an embodiment of the present invention operating in a boost mode; at FIG. 6a during the on-state, and at FIG. 6b during the off-state.
Figure 6B:
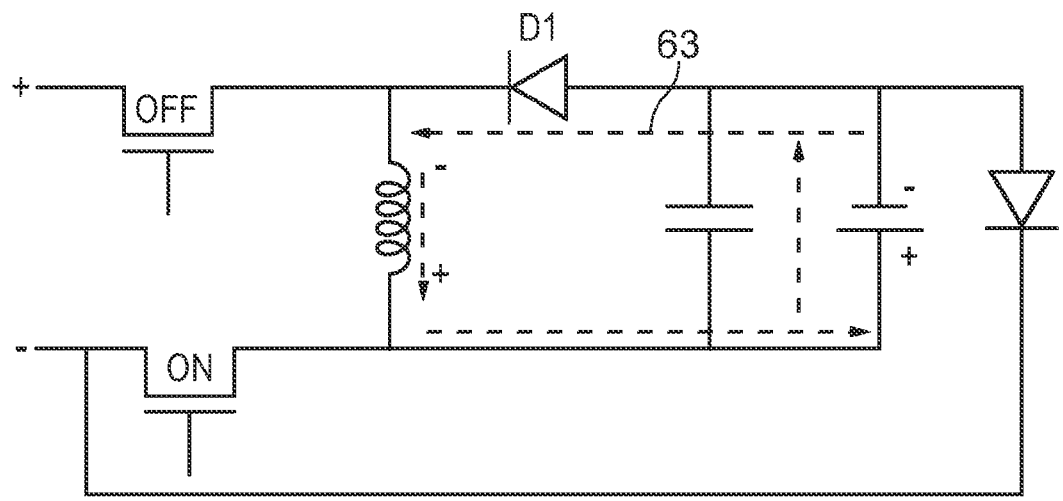

FIG. 6 shows the current flows, for the converter operating in boost mode, at FIG. 6(a) during the on-cycle, and at FIG. 6(b) during the off-cycle. In boost mode, the second switch 57 is closed or on, and the converter operates very similarly to a conventional buck-boost converter, thus: during the on-cycle the first switch 56 is closed, current 61 flows through the inductor, and the capacitor is discharged through the load by a second current 62; whilst during the off-cycle, the first switch 56 is open and the capacitor is charged from the inductor by means of current 63. In this boost mode, the only difference from a conventional boost converter is the presence of the (on) second switch 57. Provided that the "on" forward resistance of this switch ($R_{DSon}$) is kept low, the losses associated with the switch are insignificant.

Figure 7A:
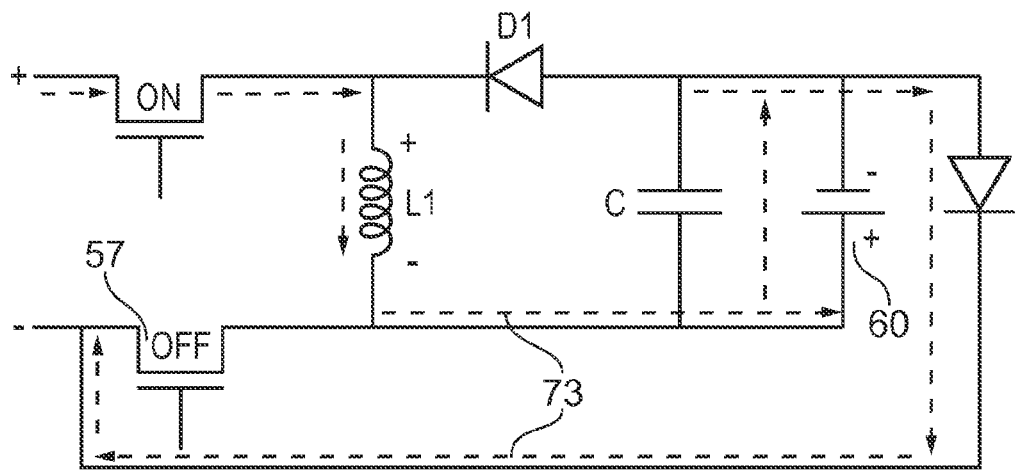
FIG. 7(a) during the on state, and that FIG. 7(b) during the off state.
Figure 7B:
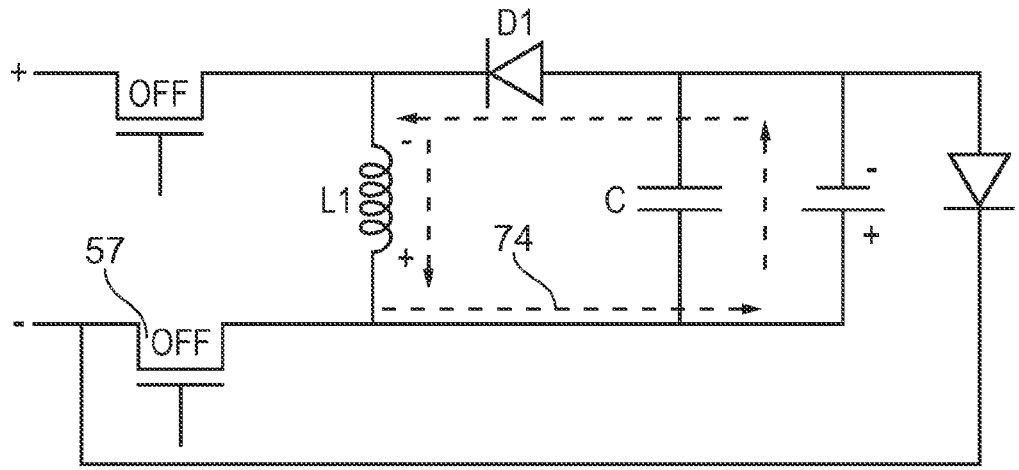
FIG. 7 shows the current flows for a buck-boost converter arranged according to an embodiment of the present invention operating in a buck mode.

FIG. 7 shows the current flows for the converter operating in buck mode, at FIG. 7(a) during an on-cycle and at FIG. 7(b) during an off-cycle. For buck mode operation, the second switch 57 is switched off or opened. During the on-cycle, the current is drawn from the source through the inductor L1, through parallel arrangement of the load 60 and smoothing (or filter) capacitor C, and back to the source through the second diode 58, as shown in path 73. In this interval, the inductor L1 is in series with the load 60 and thus both the current is used to charge the battery (that it, it is output to the load 60) and at the same time, part of it is stored in the inductor. During the off-cycle, the current stored in the inductor L1 is dissipated through the load 60 and the diode D1, which may also be referred to as a freewheeling diode, as shown at path 74.

Based on the energy transfer equation, it can easily be shown that the duty cycle, D, for the circuit in this embodiment is simply the ratio of the output and input voltages, that is to say $$D=Vout/Vin.$$

From this equation, it can be seen that the output voltage of the converters there is linearly with the duty cycle for a given input voltage. As the duty cycle D is equal to the ratio between the period Ton and the total period (that is, Ton+Toff), it maybe varied between 0 and 1: in other words, the duty cycle can never be more than 1, and thus the output voltage Vout can never be more than the input voltage Vin.

In this configuration, the current drawn from the source during both the on-cycle and the off-cycle of the PWM switch 56, always flows to the load 60. This considerably improves efficiency, in contrast of the conventional buck boost configurations where it energises first an inductor and then is passed to the load. Also, in this embodiment the ripple current in the inductor is reduced considerably relative to conventional buck-boost configurations; this improves the noise performance of the circuit and also reduces the losses in the inductor. Simulations, confirmed by measurements on a prototype, indicate that efficiencies of 97% are achievable for solar charger implemented using a reconfigurable buck-boost converter as just described.

Figure 8:
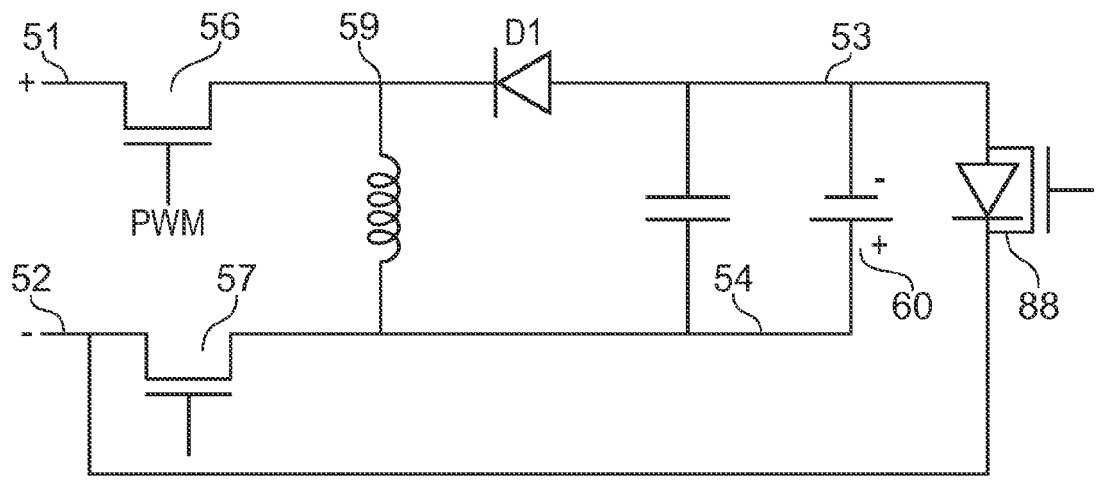
FIG. 8 shows a schematic circuit diagram of a buck-boost converter arranged according to another embodiment of the present invention.

A circuit diagram according to another embodiment of the invention is shown in FIG. 8. This circuit is similar to that shown in FIG. 5, with the exception that the diode 58 is replaced by a transistor 88, which may be a MOSFET as shown in FIG. 8. Boost mode operation of the circuit is similar to that described above; however in buck mode, wherein the second switch is off, the MOSFET 88 is switched on. Thus the switch operates inversely to the mode switch 57: for buck mode 88 is ON and 57 is OFF and for boost mode 88 is OFF and 57 is ON This embodiment is particularly beneficial, since the losses associated with the MOSFET only those of its on-state resistance ($R_{DSon}$), which can be arranged to be significantly lower than the losses associated with the forward voltage drop across diode 58. Simulations, confirmed by measurements on a prototype, indicate that efficiencies of over 98% are achievable for solar charger implemented using a reconfigurable buck-boost converter as just described In other embodiments, the freewheeling diode D1 is replaced with a MOSFET, which is synchronously switched, as a sycn-FET. This can further reduce the losses associated with this diode, although accurate synchronous switching with the PWM switch 56 is then required, as is an additional gate drive—on the high or input side.

DC-DC converters according to embodiments of the invention may be implemented either as discrete components, as a system on chip (SoC), or a combination of both.

Furthermore, although the embodiments above have been described in relation to solar chargers, the invention is not so limited, and may be used in other applications, such as without limitation powering a string of LEDs, or operating a hand-held device from a single solar cell.

In summary, then, from one viewpoint, A DC-DC converter, of for a solar charger, has been disclosed. The converter is based on a buck-boost converter, and is operable both in a boost mode, and in a buck mode. The converter differs from known converters, in that during buck mode operation, the boost mode is disabled, thereby reducing or eliminating the losses associated with buck mode operation. Methods of operating such a reconfigurable buck-boost converter also disclosed as is a computer programme product for controlling a reconfigurable buck-boost converter.

From reading the present disclosure, other variations and modifications will be apparent to the skilled person. Such variations and modifications may involve equivalent and other features which are already known in the art of DC-DC, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A DC-DC converter, the DC-DC converter comprising first and second input terminals and first and second output terminals,
   a buck-boost converter operable in a boost mode and in a buck mode and comprising a rectifying device and a first switch electrically coupled to the first input terminal and arranged for electrically coupling the first input terminal to the first output terminal via the rectifying device and further comprising an inductor electrically coupled between the second output terminal and a node between the first switch and the rectifying device, and a capacitor electrically coupled between the first and second output terminals,
   a second switch electrically coupled to the second input terminal and arranged for coupling the second input terminal to the second output terminal, and
   a switching device between the first output terminal and the second input terminal, wherein the first output terminal and the second input terminal are of the same polarity,
   wherein the second switch and the switching device are configured so as to be able to disable the boost mode.

2. A DC-DC converter as in claim 1, wherein the switching device comprises a diode.

3. A DC-DC converter as in claim 1, wherein the switching device comprises a MOSFET.

4. A DC-DC converter as in claim 1, wherein the rectifying device is a diode.

5. A solar charger comprising a DC-DC converter as in claim 1.

6. A method of controlling a DC-DC converter comprising a pulse width modulation switch and for converting an input voltage to a required output voltage at an output, the method including:
   in response to the input voltage being less than the required output voltage, configuring the converter for operation as a buck-boost converter and controlling a duty cycle of the pulse width modulation switch for boost mode operation, and
   in response to the input voltage being greater than the required output voltage, configuring the converter for operation as a buck converter and disabling the boost mode, wherein disabling the boost mode comprises opening a switch in the return path of the converter between a first output terminal and an input terminal.

7. A method according to claim 6, further comprising operating a switching device thereby electrically coupling a second output terminal of the output, opposite to the first output terminal, to the input terminal, whilst the converter is configured as a buck converter.

8. A method of controlling a DC-DC converter as in claim 6, further comprising reconfiguring the converter for operation as a buck-boost converter or a buck converter in response to the input voltage respectively being becoming less than or exceeding the required output by a respective first or second hysteresis level.

9. A non-transitory computer-readable storage medium comprising a computer program which, when implemented by a computer, controls a DC-DC converter to operate according to claim 6.

10. A DC-DC converter as in claim 1, wherein the first output terminal and the second input terminal are negative terminals.

11. A method according to claim 6, wherein the first output terminal and the second input terminal are of the same polarity.

12. A method according to claim 11, wherein the first output terminal and the second input terminal are negative terminals.

* * * * *